May 18, 1937.  E. ERMOLD  2,080,414
BOTTLE LABELING MACHINE
Original Filed May 2, 1934    7 Sheets-Sheet 1

Fig. 1.

Inventor
*Edward Ermold*

By  C. P. Goepel.
Attorney

May 18, 1937.  E. ERMOLD  2,080,414
BOTTLE LABELING MACHINE
Original Filed May 2, 1934   7 Sheets-Sheet 2

Fig. 2.

Inventor
Edward Ermold
By C. P. Goepel.
Attorney

May 18, 1937. E. ERMOLD 2,080,414
BOTTLE LABELING MACHINE
Original Filed May 2, 1934 7 Sheets-Sheet 3

Fig. 3.

Edward Ermold
By C. P. Goepel.
Attorney

May 18, 1937. E. ERMOLD 2,080,414
BOTTLE LABELING MACHINE
Original Filed May 2, 1934  7 Sheets-Sheet 7

Inventor
Edward Ermold
By C. P. Goepel.
Attorney

Patented May 18, 1937

2,080,414

UNITED STATES PATENT OFFICE 2,080,414

BOTTLE LABELING MACHINE

Edward Ermold, New York, N. Y.; Watson A. Guthrie executor of said Edward Ermold, deceased Original application May 2, 1934, Serial No. 723,432. Divided and this application March 15, 1935, Serial No. 11,223

9 Claims. (Cl. 91—18)

My present invention relates to a machine for labeling bottles, the invention being more particularly related to a machine by means of which automatically to attach cap and neck sealing labels to bottles.

An object of my invention is the provision of a machine of the character described embodying certain desired features of simplicity and convenience, which will function automatically to paste a label for application to the bottle, to carry such adhesive label to the bottle and position it across the top end thereof, to bend wing portions of the label upon opposite sides of the neck and upon the shoulders of the bottle, and finally to firmly press the label upon the neck top and its wings upon the neck sides and as well upon the shoulders of the bottle, and further to do this in such manner that the affixed label will conform faithfully to the shape of the bottle end, neck, and shoulders.

By means of my improved machine, the sealing labels can be mechanically applied to conform truly to the configuration of the bottle caps and necks, their beads, grooves and plain surfaces, so that thereby any attempt to open the bottles or remove the contents thereof, will be made visibly manifest. The field of usefulness of my improved machine embraces the affixing to bottles and the like, of labels of all kinds, including the affixing of government stamp tax or revenue labels to bottles containing alcoholic liquor.

A further object of my invention is the provision of a machine whereby automatically to affix labels to bottles of different sizes and which may have caps or other closures, necks and shoulders of different sizes, designs and configurations.

More particularly considered, the machine of the present invention for the performance of the functions and the accomplishment of the results herein contemplated, involves correlated and cooperating mechanisms and parts as follows: paste transfer roll controlling mechanism; paste applying roll controlling mechanism; label carrier plates controlling mechanism; label wing bending yoke controlling mechanism; upper presser arm controlling mechanism; side or wing presser arms controlling mechanism; and other combined parts and mechanisms having to do, in the manner hereinafter set forth, with automatic operation, control and precision, and devised to facilitate and expedite accurate affixing of cap and neck labels by operators possessing only ordinary skill in such matters.

To each label, adhesive is applied in three places; at a spot or area midway its length where it is to be affixed to the crown or end of the cap, and at spots or areas on either side of such midway place, upon the portions of the labels subsequently bent into wings which are affixed to the opposite sides of the cap, bottle neck and shoulders. Thereby I provide a continuous label seal which is adhesively applied to the cap, its opposite sides and to the opposite sides of the bottle below the cap. It is to be understood that while I shall herein employ the term "cap" to describe the closure for the bottle and have illustrated a cap in some of the figures of the drawings, the machine of my invention is not limited to a cap type of closure, but may be used with equal facility to affix labels on corks, stoppers and other types of bottle closures. Moreover, the machine of my invention is not limited to applying labels to bottles having end closures, as certain features of the invention are applicable to affixing adhesive labels to the surfaces of bottles and other containers which are free of caps or the like.

The machine of my invention is adapted to be operated continuously, to affix adhesive labels to bottles in succession, each bottle receiving its label in the same way and at the same place. A suitable work-table is provided, having means for retaining the bottle during the label-applying operation, and provision is made for readily exchanging the table for other sized tables in order to accommodate different sizes of bottles.

The subject matter of the present invention is also described in and certain novel features of the invention herein described, but not herein claimed, are claimed in my companion application for patent, filed May 2, 1934, Serial No. 723,432, of which the present application is a division.

With the above and other objects in view, the invention consists in the improved labeling machine and in the construction, combination and relative arrangement of parts, their iter-relation and coaction, as will be hereafter more fully described and claimed.

A machine embodying my invention in one form is illustrated in the accompanying drawings, in which similar reference characters designate corresponding parts throughout the several views, and in which:—

Referring now to the accompanying drawings in detail, it will be seen that the illustrated framing for the support of the working parts is of the skeleton type and comprises in general upright side sections or standards 19 and 20 in opposing relation, and these at the front end of the upright machine, adjacent the bottom thereof, are connected by a cross plate 21 and at a higher elevation by an inner cross member 22; while at the rear end of the machine the cross connection between the upright side sections consists of a stationary cross shaft 23 upon which are journally mounted a series of vertical rocker members which will presently be referred to in detail. This cross shaft is located adjacent the bottom of the machine. Intermediate the length of the machine and below the plane of the shaft 23, a driven shaft 24 extends transversely of the machine and is mounted on the side sections or standards by means of suitable journal bearings. Power for the rotation of the shaft 24 is transmitted thereto by any suitable means (not shown) from any suitable source of power (not shown). This driven shaft 24 is a cam shaft and carries a series of cam elements whereby to impart the desired movements to the several correlated operating mechanisms and working parts of the machine.

At the front end of the machine, means are provided for the support of the bottles or workpieces to which the labels are to be applied; and in the present embodiment the means for this purpose is represented as comprising a bracket-mount 25 which is bolted for its upright support to the cross plate 21. Mounted on the vertical portion 25' of this bracket mount and for vertical sliding adjustment on the vertical face thereof is a table-plate bracket-mount 26, the mode of attachment for vertical adjustment consisting in providing the vertical portion of this mount with a vertically extending slot 27, shown in Figure 3, together with securing means in the form of a headed bolt 28 which is passed inwardly through the slot and screw-threaded into the bracket mount 25. By loosening the screw bolt, the mount 26 may be adjusted vertically to the extent permitted by the slot 27, and by tightening the screw bolt this amount may be rigidly secured at the elevation desired. The horizontal portion 29 of the table-plate bracket-mount 26 is provided with an elongated slot 30 which extends in the direction of the length of the machine and provides for the adjustment in a similar direction of the bottle supporting table-plate 31 which is formed with a depending boss 32 of less length than said slot 30. For securing the table-plate 31 in the adjusted position desired, a wing screw 33 extends upwardly through the slot 30 and is screw-threaded in the boss 32. This table-plate is furnished with upstanding bottle retaining members 34, 34 the rear portions 34', 34' of which are directed inwardly towards one another to serve as back stops for positioning the bottle.

The several cam members fixedly secured to the driven shaft 24, together with the general functions thereof, are as follows: cam 35a which imparts motion to two jointed motion transmitting lines or pressure applying arm structures each of which carries a presser head member 36a; cam 37b which imparts motion to a transmission line or construction carrying a paste or adhesive applicator roll 38b; cam 39c which imparts motion to an operating line or system which carries a label wing bending tool or yoke 40c; cam 41d which imparts motion to a line or constructional system carrying label carrier plates 42d; cam 43e which imparts motion to an operating line or system carrying a paste or adhesive transfer roll 44e; and cam 45f which imparts motion to an operating line or system carrying an upper presser head member 46f.

Figure 2:
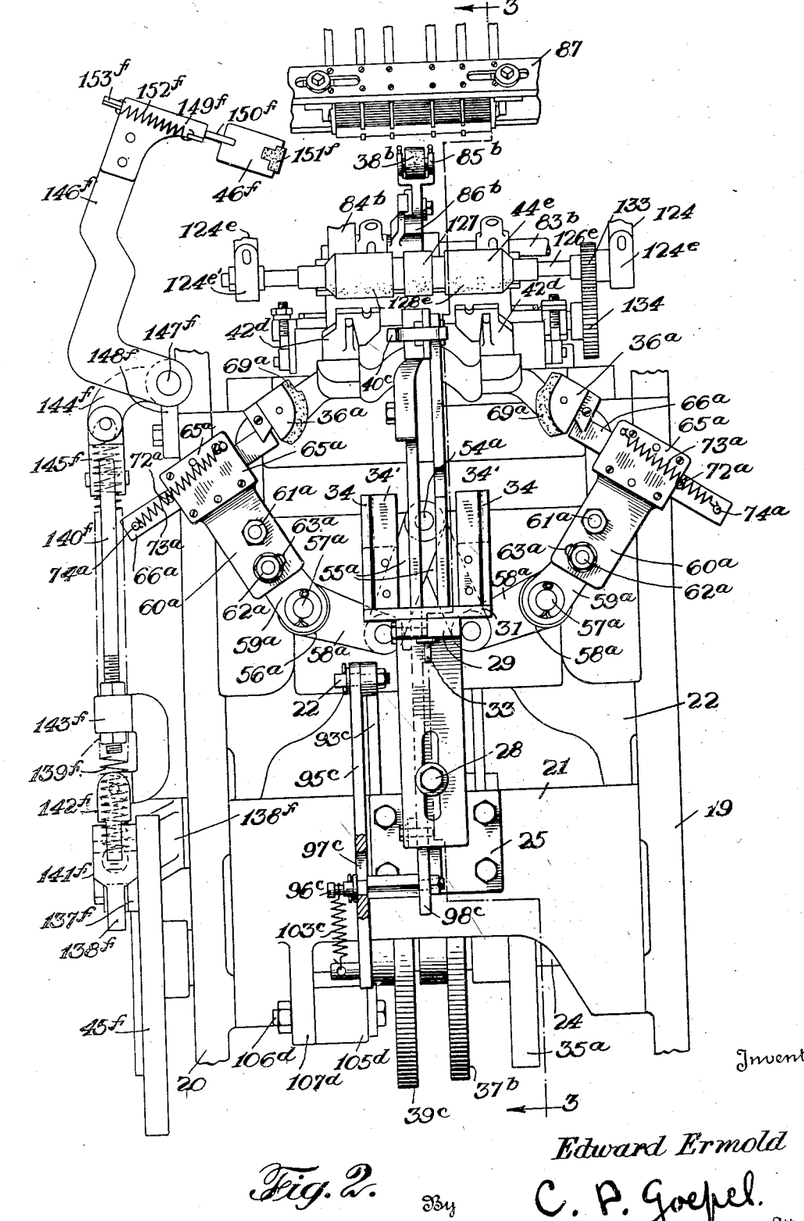
Fig. 2 is a fragmentary front elevational view of the machine.
Figure 3:
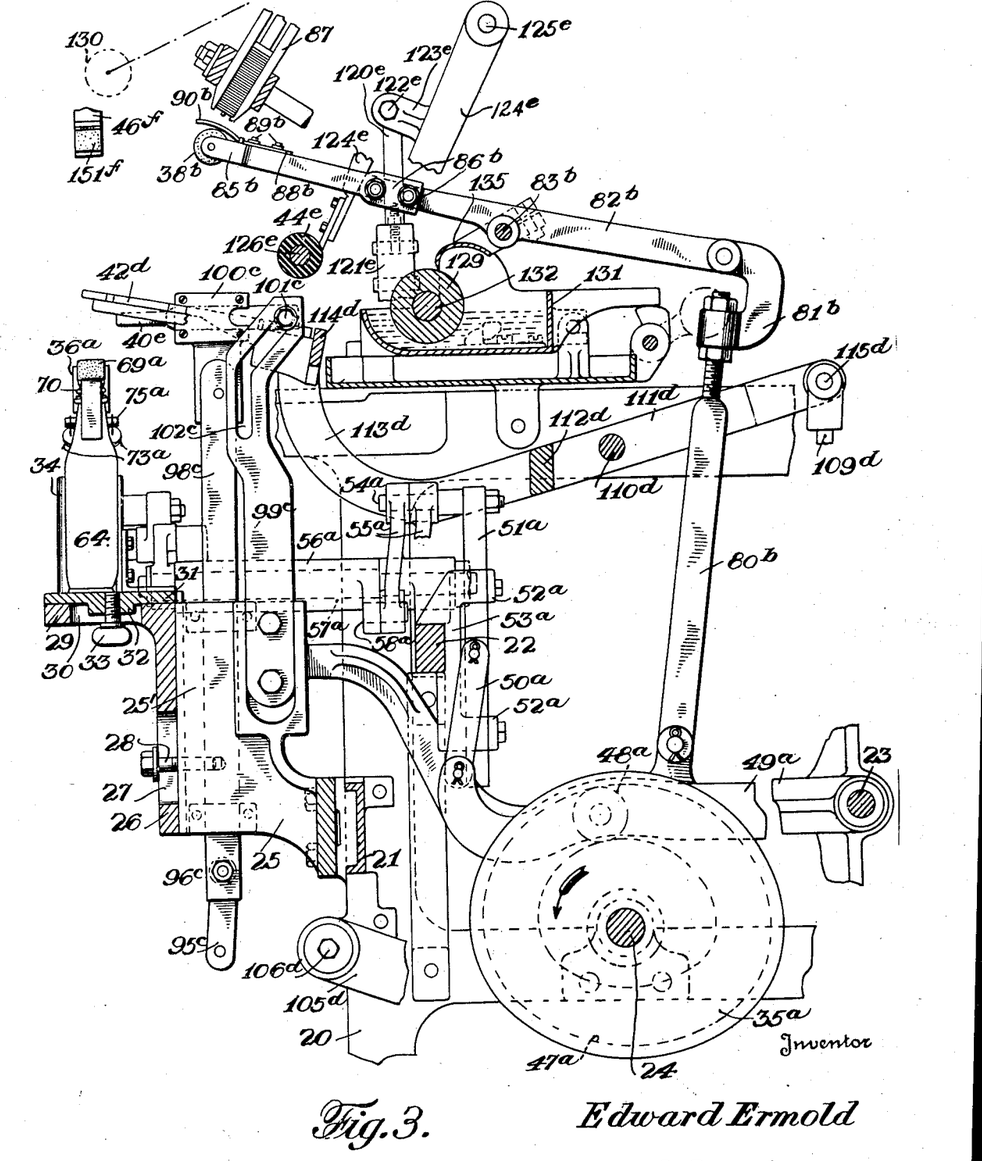
Fig. 3 is a fragmentary vertical section through the machine from front to rear, taken on the line 3—3 of Fig. 2.

Referring now to the cam 35a and the mechanism controlled thereby for operating the two presser head members 36a, it will be seen from Fig. 3 that the working face of this cam is provided with an eccentric cam groove 47a in which is engaged a roller 48a carried by vertical rocker arm 49a the rear end of which is journally mounted on stationary shaft 23. The front end of rocker arm 49a is pivotally connected through a link 50a with a slide 51a mounted for vertical reciprocating action in spaced horizontal members 52a, 52a projecting rearwardly from a bracket 53a secured to the cross member 22. At its top end the vertical slide 51a carries a horizontal pin 54a with which are fixedly engaged two depending cranks 55a, 55a. Two horizontal sleeves 56a, 56a, rockably mounted on pins 57a 57a, have lateral crank members 58a, 58a, pivotally united with the lower ends of the cranks 55a, 55a. These pins are suitably fixed to the frame parts so that the sleeves will rock thereon, to and fro, upon the alternating reciprocating action of the vertical slide. Each sleeve 56a at its forward end has a crank arm 59a adjustably engaged within a sleeve head 60a mounted intermediate its length on a fulcrum pin 61a fixed to a suitable frame part. Each sleeve crank 59a is connected with its sleeve head 60a by a pin and slot connection 62a and 63a. These two articulated lines or systems may, for convenience of reference, be referred to as jointed side arms; and as illustrated in Fig. 2, the sleeve heads extend upwardly in opposite directions and rock on pivots in such positions that as the slide 51a reciprocates vertically, the upper or head ends thereof will rock inwardly and outwardly towards and away from the neck of a bottle 64 properly located upon the table-plate 31.

Figure 12:
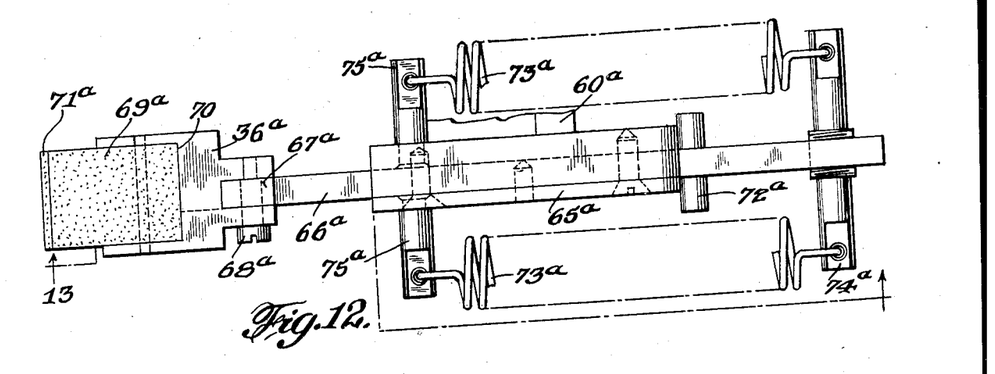
Fig. 12 is a detailed view in plan of one of the self-setting appliances for pressing a bent label wing portion against the bottle neck.
Figure 13:
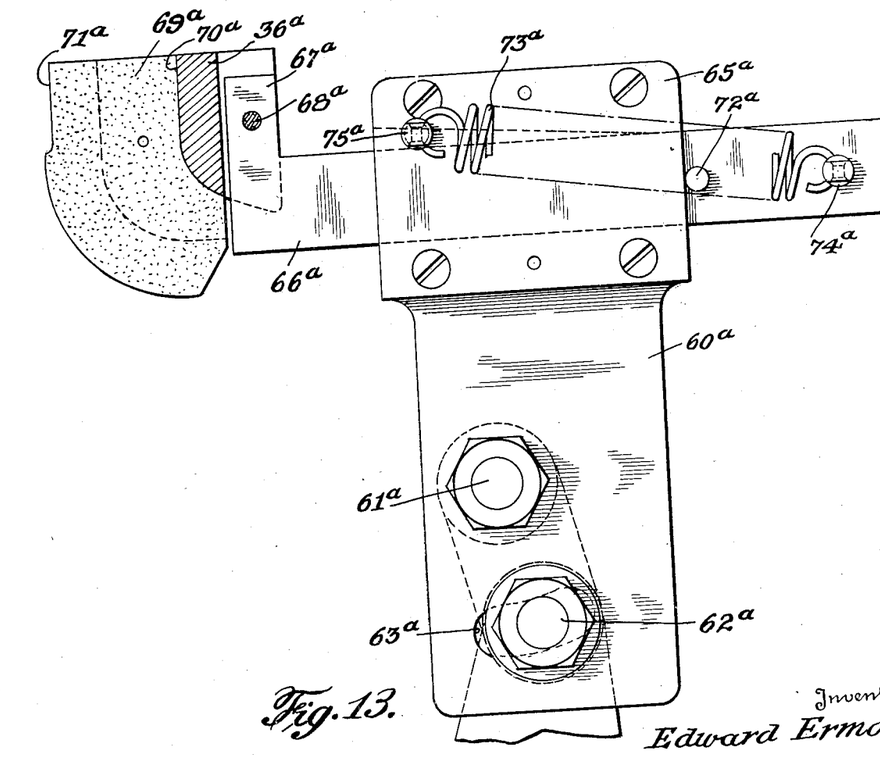
Fig. 13 is a side view of the parts shown in Fig. 12.
Figures 14, 15, 16, 17, 18:
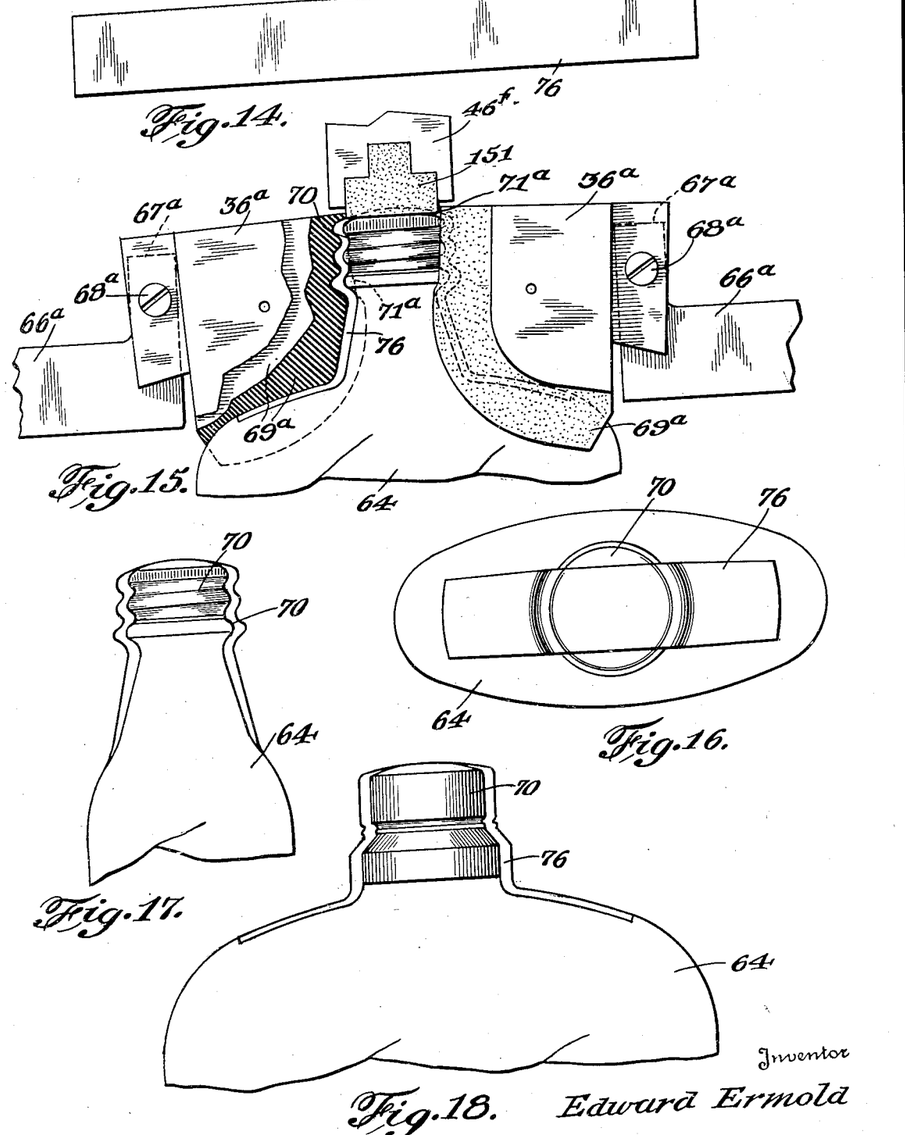
Fig. 14 is a plan view of a label strip.
Fig. 15 is a detailed fragmentary view, partially in section, showing a pair of self-setting appliances for pressing the opposite label wing portions against the bottle neck and shoulders.
Fig. 16 is a top plan view, illustrating a bottle having a label applied by the present machine.
Fig. 17 is a fragmentary side elevational view, showing a bottle with a label applied by the machine.
Fig. 18 is a fragmentary side elevational view of another type of labeled bottle, the label of which may be applied by the machine.

By referring to Figs. 12 and 13 in connection with Fig. 2, it will be seen that in the top portion 65a of each sleeve head member 60a there is loosely mounted for independent reciprocating action a slide bar 66a the inner end 67a of which has pivoted thereto at 68a the presser head member 36a. Soft, adaptable pad-body mediums 69a are secured within and project inwardly from recesses 70a provided for the purpose in the presser head members 36a, and it will be observed that the recesses 70a as well as the pad-body mediums have the lower portions thereof made with a downward and outward curving shape. These pad-body mediums preferably consist of rubber sponge, although they may consist in practice of any suitable soft material adapted, when forcibly pressed against an object, to assume substantially at the surface contact the shape or contour of that object. In the present exemplification, the rubber sponge pad-bodies 69a have their contact faces shaped substantially to suit the shape of the closure caps, necks and shoulders of the bottles on which labels are to be pasted. For the accommodation of the closure caps 70 (Fig. 15), the rubber sponges may have at the tops of their contact faces suitable cut-out portions 71a (Fig. 13). The slide bar 66a of each sleeve head member is normally urged inwardly to the extent permitted by a stop pin 72a by means of two pull springs 73a, 73a connected at one end to a cross pin 74a attached to the slide bar itself and connected at the other end to pins 75a projecting laterally from the opposite sides of the sleeve head member. It will be noted in this connection that the slide bars with their pull springs are so arranged that the former are normally urged inwardly and upwardly in opposed relation as shown in Fig. 2 and at opposite sides of the bottle, so that when under the operation of the control cam 35a the vertical slide is moved upwardly, the two articulated arm structures will be swung in an inward direction towards each other and to an extent that the rubber sponge pad-bodies will contact and press from opposite directions against the opposite sides of the cap, neck and shoulders of a bottle suitably disposed on the table 31. In Fig. 15, I show the two articulated arms moved inwardly from opposite directions with their rubber sponge pad-bodies pressing an applied label strip 76 tightly against the opposite sides of the bottle cap, neck and shoulders, the rubber sponge elements under the pressural force assuming the configuration of the various parts so that the label strip will be caused to assume the shape or configuration of the threads, or beads and of the outline of the shoulders against which it is tightly pressed.

Figure 1:
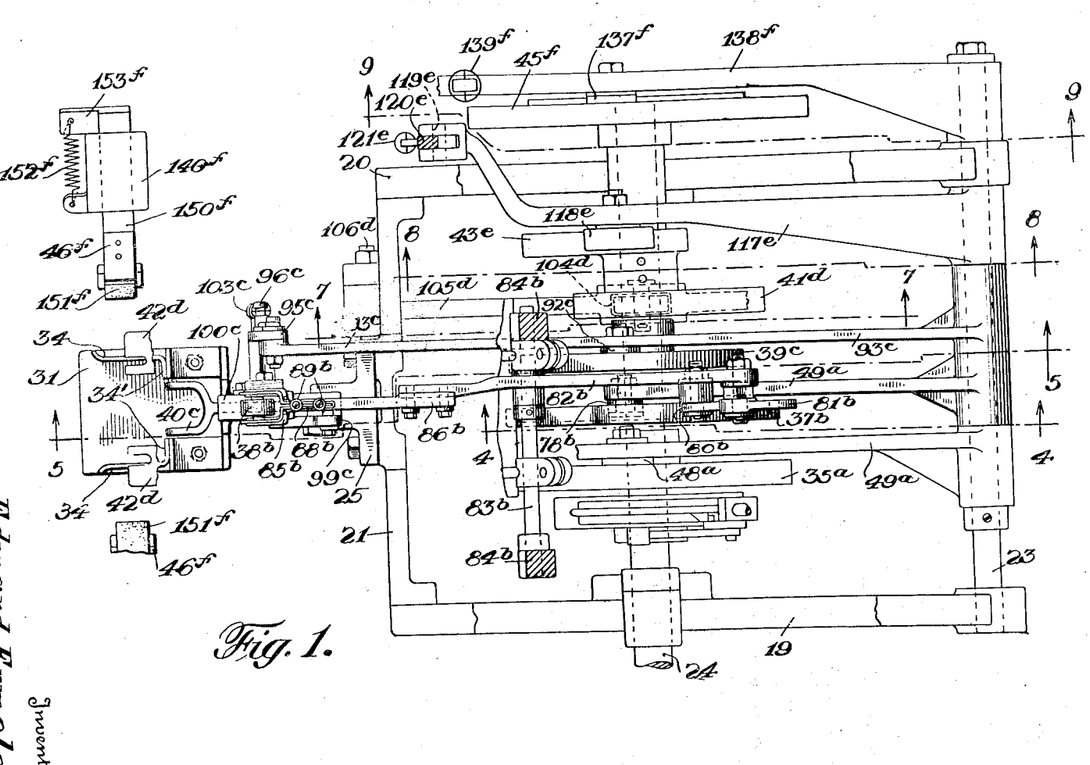
Figure 1 is a plan and partial sectional view of a machine embodying my invention, with some parts thereof removed and some omitted to more clearly disclose certain of the parts which would otherwise be obscured.
Figures 9, 10, 11:
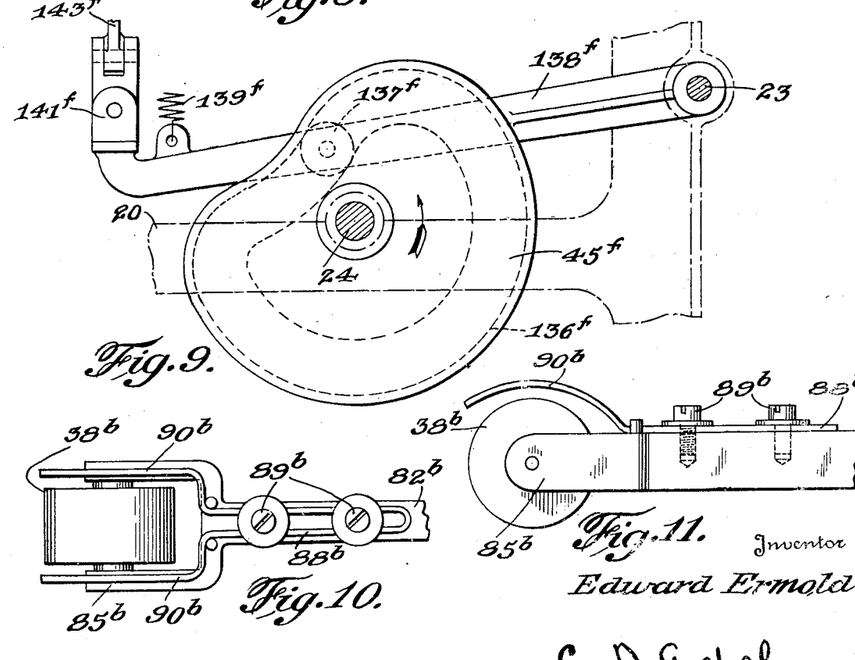
Fig. 9 is a similar view, taken on the line 9—9 of Fig. 1, showing the control cam for the upper arm presser mechanism.
Fig. 10 is a detailed fragmentary top plan of the paste applicator roll and its label guard spring.
Fig. 11 is a side view of the parts shown in Fig. 10.

The cam 37b, which controls the mechanism for operating the paste-applying roll 38b, has on its working face (Fig. 4) an irregular cam groove 77b wherein is engaged a roller 78b carried by a vertical rocker arm 79b the rear end of which is journally mounted on stationary shaft 23. Said rocker arm 79b is made with an upwardly extending branch 80b with the top end of which above the skeleton frame of the machine is engaged the angular end 81b of a lever arm 82b fulcrumed for rocking movement on a transverse shaft 83b suitably fixed in frame parts as 84b. The yoked forward end 85b of this lever arm carries the paste-applying roll or applicator 38b; and between the yoked end 85b and the fulcrum shaft 83b, this lever arm is provided with an overlapping extensible coupling portion 86b, Figures 1 and 3, by means of which limitedly to lengthen or shorten the extent of this arm beyond the point of the fulcrum shaft. The purpose of the applicator roll 38b is to apply paste to the central portion of the label strip 76 which is held by a label carrier 87 of any conventional or approved type capable of supplying successive labels which are to be pasted and transferred for application to successive bottles. The applicator roll 38b receives its supply of paste from the paste transfer roll 44e through the contact of the latter with the former, as will presently appear; and after receiving its supply of paste the lever arm 82b, through motion which it receives from the cam 37b and connected transmission parts, moves upwardly to contact with and apply adhesive to the central portion of the label strip 76. In order that, when the applicator roll retracts from the label 76 after applying adhesive thereto, the label will not also be withdrawn from the label-holder, there is provided, as best shown in Figs. 10 and 11, a yoke-shaped guard spring 88b the shank of which is secured upon the top edge of the lever arm 82b and longitudinally thereof by screws 89b. This guard spring is made with opposite arms 90b, made in upwardly bowed form so as to come beyond the periphery of the applicator roll. This guard spring, when the applicator roll is moved to contact the label in the label holder, engages the label holder parts and thereby yields sufficiently to permit contact of the applicator roll with the label, and then as the applicator roll retracts from the label, the tensioned spring arms 90b react against the label sufficiently to prevent any withdrawing of the label by the applicator roll.

Figures 4, 5, 6:
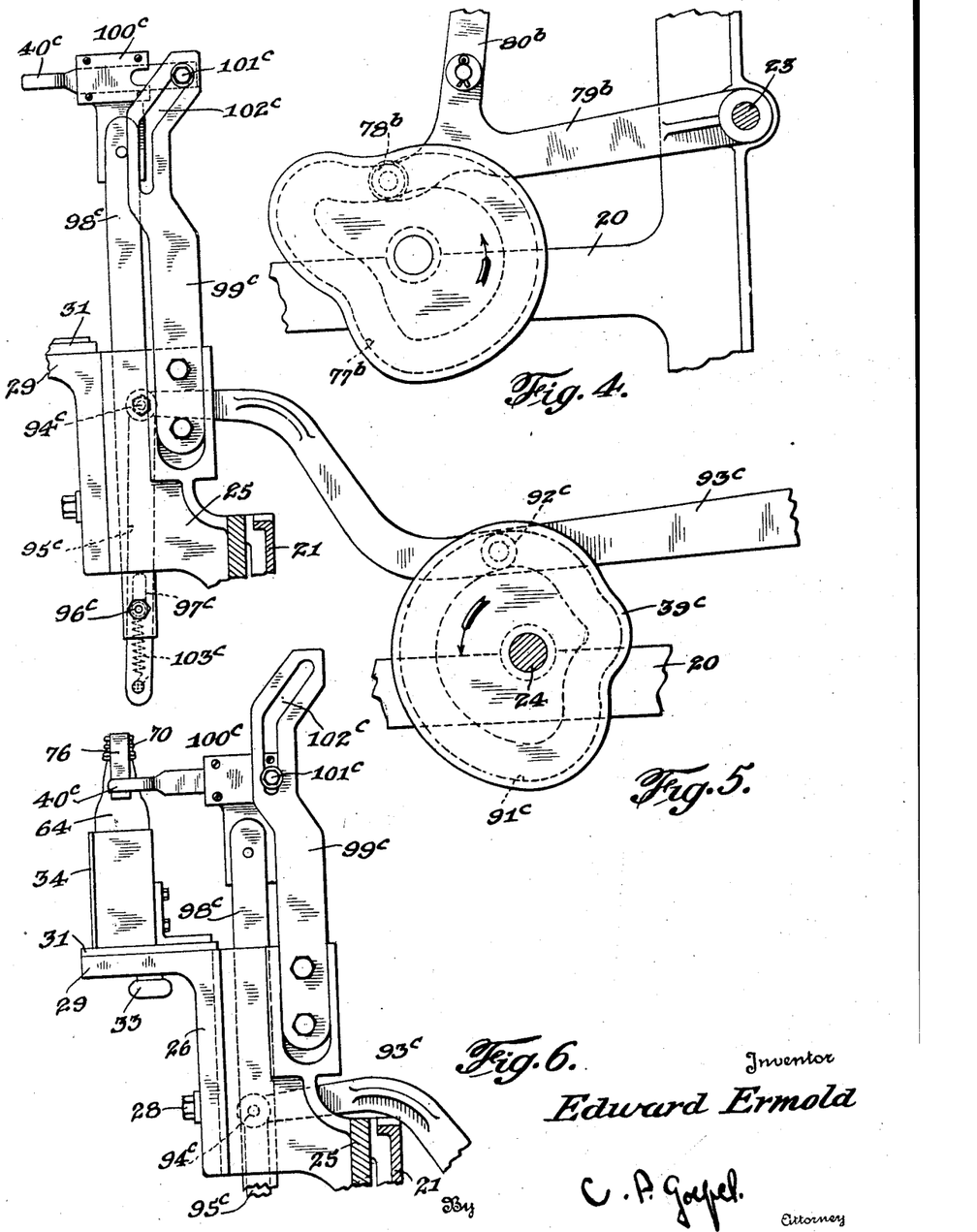
Fig. 4 is a fragmentary vertical sectional view, taken on the line 4—4 of Fig. 1, and showing the cam for controlling the paste applying mechanism having a roll applicator.
Fig. 5 is a similar view, taken on the line 5—5 of Fig. 1, showing the mechanism for bending the labels upon the bottle neck and the control cam for such mechanism.
Fig. 6 is another view of the label-bending mechanism, disclosing the parts as they appear when the label-bending yoke is substantially in its lowered position.

The cam 39c, which controls the operation of the label wing bending yoke 40c, has in its working face an irregular cam groove 91c wherein is engaged a roller 92c carried by a vertical rocker arm 93c which is journally mounted on the stationary shaft 23. As shown in Figs. 5 and 6, said rocker arm 93c curves upwardly adjacent its forward end and is pivotally united at 94c to the top end of a link member 95c the lower end of which is connected by pin and slot connection 96c and 97c, with vertical slide bar 98c which operates in a suitable guide-way provided for the purpose in the vertically disposed portion of the bracket mount 25. Said slide bar 96c, due to its pivoting at 96c on the link 95c, not only has vertical movement but also limited movement forwardly and backwardly with respect to the upright guide arm 99c. Pinned to the top of the slide bar 98c is a cross head 100c wherein is mounted for horizontal reciprocating movement the stem of the wing-bending yoke 40c. Rearwardly of the head 100c the stem of the yoke 40c is provided with a lateral pin 101c which is engaged in a slot 102c the upper portion of which extends downwardly and forwardly, while its communicating lower portion extends vertically. With this construction of parts, each time the cam 39c rotates, the yoke 40c will be given a movement, first in a downwardly inclined plane in a forward direction and then in a vertical downward direction, the last-named movement bringing the members of the yoke on opposite sides of the bottle neck so as to apply the wing portions of the label strip on the opposite sides of the bottle neck, as shown in Fig. 6. A spring 103c serves as means for positively re-positioning all of the parts of this mechanism after each downward operation.

Figure 7:
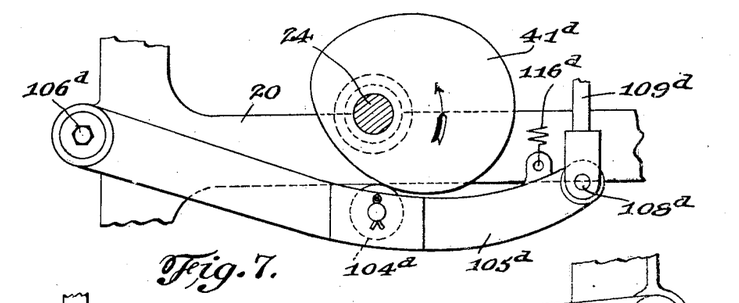
Fig. 7 is a fragmentary vertical sectional view, taken on the line 7—7 of Fig. 1, and showing the control cam for the label-carrying mechanism having spaced positioning plates.

The cam 41d by means of which motion is imparted to mechanism for operating the label carrier plate 42d, is of irregular form as shown in Fig. 7 and turning on its periphery is a roller 104d carried by a horizontal rocker arm 105d the forward end of which is pivoted, as shown at the bottom of Figure 2, on a pin 106d carried by lug 107d projecting from the cross plate 21. At its forward end, said rocker arm 105d is pivoted at 108d to an upwardly extending rod 109d. Fulcrumed on a transverse shaft 110d (Fig. 3) is a rocker frame composed of two substantially parallel bars 111d connected by a cross piece 112d. At their forward ends these bars curve upwardly as at 113d, the extreme upper ends thereof being connected to a cross head 114d from which there projects forwardly the two label carrier plates 42d. At its rear end, the frame 111d is pivotally united at 115d with the top end of the connecting rod 109d. A pull spring 116d (Fig. 7) resiliently maintains the rocker arm 105d in such position that the roller 104d constantly engages the periphery of the cam 41d. These parts are so arranged that when during the rotation of the cam 41d, the frame 111d is at its lower terminal of movement, the two label carrier plates 42d which lie in a common plane, will have their top surfaces lying substantially in the horizontal plane of the bottle closure cap 70; and so that when said frame 111d is at its upper terminal of movement, the said carrier plates 42d will contact the label strip 76 on either side of its central region wherewith the applicator roll 38b contacts. In other words, the carrier plates 42d are reciprocated in a path which leads from the label-holder in the label carrier to adjacent the closure cap on the top end of the bottle neck; the said carrier plates at the label carrier contacting with and picking up a label, and at the closure cap for the bottle laying the picked-up label across the crown or top surface of the closure cap. In this connection it is to be observed that the two carrier plates 42d are spaced apart a distance sufficient to come adjacent the opposite sides of the bottle cap and so as to permit the opposing arms of the yoke 40c to pass between them downwardly along the opposite sides of the closure cap and bottle neck. The said carrier plates 42d also serve as adhesive applicators. They receive their supply of adhesive on their top surfaces from contacting with the adhesive transfer roll 44c. The gap between the two carrier plates 42d is of greater extent than the longitudinal length of the applicator roll 38b, so that when said plates 42d contact with the label strip they will apply adhesive thereto on those portions thereof which are to be bent down by the yoke 40c onto the opposite sides of the bottle neck and shoulders.

Figure 8:
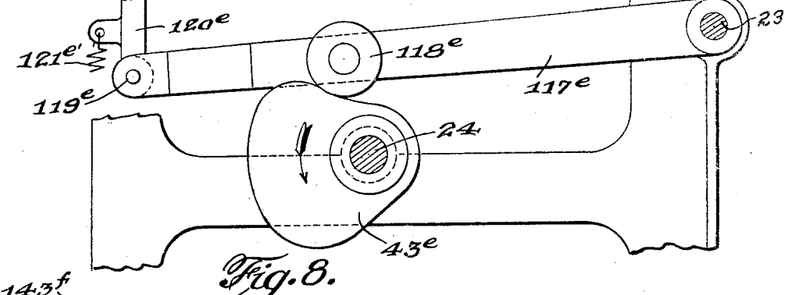
Fig. 8 is a similar view taken on the line 8—8 of Fig. 1, showing the control cam for the paste transfer mechanism having an applicator roll.

For the operation of the paste transfer roll 44e, the cam 43e controls a line or system of mechanism which includes rocker arm 117e journally mounted at its rear end on the stationary shaft 23. This rocker arm carries a roller 118e which turns on the periphery of control cam 43e (see Fig. 8). The front end of rocker arm 117e is pivotally united at its forward end at 119e with an upwardly extending rod 120e which has incorporated therein (Fig. 3) an adjustable part 121e the purpose of which is to provide means for increasing or shortening the length of the rod 120e. A tensioning spring 121e' (Fig. 8) urges the rod 120e and the arm 117e in the direction necessary to keep the roller 118e in contact with the periphery of the cam 43e. At its upper end, said rod 120e is pivotally united at 122e with a crank arm 123e projecting from a hanger arm 124e the upper end of which is journally mounted on a shaft 125e supported by suitable framing (not shown) of the machine framework. Opposite the hanger arm 124e and also journally mounted on the shaft 125e is a complemental hanger arm 124e'. These two hanger arms 124e and 124e' carry at their lower ends a rotatable shaft 126e (Figs. 2 and 3). Secured upon the shaft 126e and rotated therewith is the paste-applying roll 44e which, as shown in Fig. 2, is divided into three sections of which 127 is the central section devised to supply adhesive to the applicator roll 38b, while the adjacent outer sections 128e, 128e are devised to apply paste to the label-carrying plates 42d, 42d. Under the operation of the cam 43e, the paste transfer roll 44e has alternating reciprocating movement in a path between a paste supply roll 129 and a point indicated by the broken outline 130 which is well beyond the location of the label carrier, as shown in Fig. 3. The paste-supply roll 129 turns through paste contained in a vessel 131 suitably mounted upon the machine framework and the shaft 132 of this paste-supply roll may be suitably mounted in the side walls of the vessel 131. It will be appreciated that the movement of the paste-transfer roll 44e is on an arc of which the shaft 125e is the center, and as shown in Fig. 2 the shafts 126e and 132, are provided, respectively, with gears 133 and 134 which come into engagement when the roll 44e comes into paste-acquiring contact with the supply roll 129 and by reason of such meshing engagement the supply roll 129 is given a partial rotation. A scraper device 135 is attached to the shaft 83b and adjusted thereon so that its free end will remove excess adhesive from the periphery of the supply roll 129 in advance of the point of contact made therewith by the transfer roll 44e. The function of the paste-transfer roll 44e is to obtain paste from the supply roll 129 and transmit the same to the applicator roll 38b and the plates 42d, these parts being operated in such relation that the central portion 127 will contact with the applicator roll 38b at the time the two outer sections 128e, 128e make contact with the two plates 42d.

The operation of the upper presser head member 46f is controlled through mechanisms under the control of the cam 45f (Fig. 9). The working face of the cam 45f is provided with an irregular cam slot 136f in which is engaged a roller 137f carried by horizontal rocker arm 138f journally mounted at its rear end on the stationary shaft 23. This rocker arm is suitably tensioned by a spring 139f. A vertical rod 140f (Fig. 2) is connected with the front end of the rocker arm 138f through suitable knuckle joints 141f, 142f and a yoke-shaped link 143f. Said vertical rod 140f is connected at its upper end with lever arm 144f through knuckle joint 145f. The lever arm 144f is formed as an integral part of the upwardly extending lever 146f and is rockingly journaled on a fixed stud pin 147f projecting from a plate 148f adjustably mounted on the machine framework. At its upper end the arm 146f carries a head 149f in which is mounted a slide bar 150f which carries at its inner end the presser head member 46f. A soft, adaptable pad-body medium, 151f, preferably consisting of rubber sponge, is attached to the free end of the presser head member 46f and has a contacting face of a size suitable to make pressure upon the top or crown of the bottle cap 70 (Fig. 15). The presser head member 46f with its rubber sponge pad-body is normally spring-urged inwardly by a pull spring 152f to the limit of movement permitted by a stop pin 153f carried by the slide bar 150f. This presser head member is, therefore, of the self-setting variety, its pressural movement against the crown of the cap being effected against the urge of the spring 152f which naturally yields to permit strong pressural contact movement of the presser head member 46f toward the lever arm head 149f. Being swingably journaled on the stud pivot 147f, the lever arm 146f with its presser head member is adapted to be given movement in an arc from the elevated position shown in Fig. 2 to the lowered position shown in Fig. 15 where the rubber sponge pad-body is illustrated as exerting pressural force upon the central label portion which crosses the crown of the cap 70.

We have seen that the cam 35a controls the in and out operation of the opposing side arms which carry the presser head members 36a and that these members, when at their inner terminals of movement, make pressure upon the opposite sides or bent-down wings of the adhesive label, pressing and smoothing such wings tightly against the opposite sides of the bottle cap, neck and shoulders, and due to the provision of the rubber sponge pad-bodies, that these label wings during the pressing operation will be caused to faithfully assume and reproduce the configuration of the threads, beads and other surfaces which they overlie. The operation of the applicator roll 38b is controlled by the mechanism under the control of cam 37b, this applicator roll having for its function to take adhesive from the transfer roll 44e and apply it to the central portion of a label held by the label carrier 87 and being equipped with a spring guard whereby, when the applicator roll moves from the label contacted thereby, it will not carry the label with it. We have also seen that the yoke 40c, operated from the cam 39c, comprises members adapted to pass on opposite sides of the bottle cap and neck and also to pass through the gap between the plates 42d, and that the function of this element is to remove a carried label from the plates 42d and bend the wings of such label downwardly along the sides of the bottle cap, neck and shoulders. The spaced label carrier plates 42d are operated from the cam 41d and reciprocated in a path to carry a label from the label carrier to the bottle and in position for the yoke element to perform the wing-bending operation. The paste transfer roll 44e, operated from the cam 43e, moves in a curving path to carry paste from the supply roll to the applicator roll and the two label-carrying plates. Also, we have seen, that the upper presser head member 46f, operated from the cam 45f, serves as means to smooth and press the central portion of the label upon the surface of the top or crown of the bottle cap.

The various cams and the individual lines or systems of transmission controlled thereby, operate in continuous correlated timed relation so that successive labels will be pasted, carried to, applied and pressed upon successive bottles. A cycle of operation may be explained as follows: Let us assume that the paste-transfer roll 44e is on its way from its outer terminal shown at 130 to the supply roll 129 and assuming further that thre carrier plates 42d with a label attached thereto are nearing the top end of the bottle. As soon as the carrier plates 42d reach their lower terminal where the carried label is positioned horizontally on the cap crown, the label wing-bending yoke 40c and the upper presser head member 46f, having also been moving in their respective downward courses, become effective; the yoke to bend the label wing portions alongside the opposite sides of the bottle neck, such wing portions already being withdrawn from the carrier plates and as they are withdrawn being moved down through the gap between said plates, and the upper presser head member being then effective to contact and yieldably exert pressure upon the central portion of the label overlying the crown of the bottle cap.

In the meantime the transfer roll 44e completes its journey to the supply roll 129 and acquires therefrom its supply of adhesive, so that by the time the carrier plates 42d move along their upward path, the transfer roll will be on its retroactive course during which it will meet and contact the said carrier plates and the applicator roll 38b to furnish them with adhesive. As the carrier plates 42d move up, the yoke 40c continues its downward course to its lower terminal of movement to complete the application of the label wings to the bottle neck and shoulders. The yoke completes its application work and draws away from the bottle neck to permit the application of the cooperating side arm presser head members 36a just prior to the time the transfer roll 44e contacts with the carrier plates 42d and applicator roll 38b.

After the transfer roll 44e contacts with the carrier plates 42d and applicator roll 38b, it continues on to the position indicated at 130 and thus out of the path of the carrier plates, during which time the applicator roll 38b moves into contact with the label, which operation is followed by contact with the label by the carrier plates. Next the applicator roll draws away from the label, clearing the way for the carrier plates to bring down the label for the next bottle. During this operation the upper presser head member 46f and the cooperating side presser head members 36a are withdrawn from the bottle to permit its removal and the placing of the next bottle on the table-plate in time for the carrier plates to bring the label which has been picked up, into proper horizontal position for application to such next bottle.

By the machine of my invention, I am enabled to paste and apply labels to bottles at a rapid rate, producing a tight pasted label that faithfully conforms to the surface configurations of the bottle. The machine being automatic, unskilled labor, with little or even no previous experience in labeling bottles, can be quickly taught to operate the machine and to paste the labels on the bottles in a uniform and attractive way.

It will be understood that the invention is not limited to the application of labels to the caps and necks of bottles, for it may be used to paste labels on various portions of the bottles and as well on small articles other than bottles. Moreover, the terms and expressions which I have employed are used as terms of description and not of limitation, and I have no intention, in the use of such terms and expressions, of excluding equivalents of the features shown and described or portions thereof, but recognize that various modifications are possible within the scope of the invention claimed.

As many changes could be made in the above construction and many apparently widely different embodiments of this invention could be made without departing from the scope thereof, it is intended that all matter contained in the above description or shown in the accompanying drawings, shall be interpreted as illustrative and not in a limiting sense.

I claim:—

1. Reciprocating pasting mechanisms for a reciprocating label carrier having spaced apart plates, operable from the mechanism for operating the label carrier, said pasting mechanisms comprising an adhesive transfer roll arranged to operate transversely of the path of movement of the carrier and having spaced sections for contact by said plates whereby to supply paste to said plates, and also having a third section between said spaced sections, and a label applicator roll arranged to operate to a position for contact by said third section when said plates contact said spaced sections, the effective surface of said third section and said applicator roll in their longitudinal direction being of less extent than that of the space existent between said spaced apart plates.

2. In a labeling machine, the combination with a reciprocating label carrier having spaced apart plates, of a reciprocating adhesive transfer roll having end roll sections and a central roll section, and a reciprocating applicator roll, the path of movement of said label carrier, transfer roll and applicator roll being directed and correlated so that at least once during the reciprocation of said parts the said spaced plates will contact the end roll sections and the applicator roll will contact the central roll section.

3. In a bottle neck labeling machine, means for applying paste to the central portion of a label strip including an applicator roll, a transfer roll for supplying paste, a label carrier having plates in a common plane spaced apart a distance greater than the length of the applicator roll, said transfer roll supplying paste to said applicator roll and said plates by passing between and contacting the same simultaneously, said plates being effective to engage their paste supplied surfaces with the label strip on either side of the pasted central portion thereof.

4. A plurality of paste-applying devices for a labeling machine, the latter comprising means for holding a label, said devices including a pair of plates spaced apart to contact the label at its outer portions on opposite sides of a central portion, means for applying paste to said central portion, and means for applying paste to said central portion applying means and to said plates prior to the contact of said parts with said label.

5. In combination a label holding means including a pair of plates spaced apart to contact the label at its outer portions on opposite sides of a central portion, a swingable member provided with an applicator roll for applying paste to a label in the holding means, and means carried by the swingable member adjacent the roll comprising a spring disposed to contact the label and effective to prevent removal by the roll of the label receiving the application of paste therefrom.

6. A paste applicator comprising a movable member carrying an applicator roll for applying paste to an object, and a spring attached to said member and formed with free resilient portions disposed to contact the object at points on either side of the pasted zone produced on the object through contact therewith by the roll, said portions being effective to prevent withdrawal of the object by the roll on the withdrawal of the latter.

7. In a labeling machine of the type having an adhesive supply roll and a label carrier, the combination of a movable adhesive transfer roll having end portions and a central portion for engaging the supply roll to receive adhesive therefrom, a movable label carrier comprising spaced plates adapted to contact the end portions of the transfer roll to receive adhesive therefrom and subsequently to contact a label on the carrier, a movable applicator roll adapted to contact the central portion of the transfer roll and subsequently the label at a point between the contacts of the plates therewith, and means associated with the applicator roll to prevent adhesion of the label to the applicator roll.

8. In a labeling machine, the combination of movable means carrying a transfer roll having, for carrying adhesive, spaced end portions and a central portion between the end portions, movable means carrying a label carrier comprising plates spaced substantially according to the spacing of the end portions for contacting said end portions and receiving adhesive therefrom, and movable means carrying an applicator roll for contacting said central portion to receive adhesive therefrom.

9. In a labeling machine, the combination of movable means carrying a transfer roll having, for carrying adhesive, spaced end portions and a central portion between the end portions, movable means carrying a label carrier comprising plates spaced substantially according to the spacing of the end portions for contacting said end portions and receiving adhesive therefrom, movable means carrying an applicator roll for contacting said central portion to receive adhesive therefrom, and an individual cam controlled transmission line for each of said movable means controlling the actuation of the same, said cam controlled transmission lines being so arranged and correlated in their respective working functions as to cause said plates and end portions to come into contact substantially at the time said applicator roll and central portion have contact with each other.

EDWARD ERMOLD.